(12) United States Patent
Ramakrishnan et al.

(10) Patent No.: US 12,518,052 B2
(45) Date of Patent: Jan. 6, 2026

(54) AUTOMATED PRIVACY PROFILING FRAMEWORK FOR MACHINE LEARNING WORKSPACES

(71) Applicant: Dell Products L.P., Round Rock, TX (US)

(72) Inventors: Thiagarajan Ramakrishnan, Round Rock, TX (US); Leandro Machado Lopes, Austin, TX (US); Shamik Kacker, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 18/365,336

(22) Filed: Aug. 4, 2023

(65) Prior Publication Data

US 2025/0045451 A1 Feb. 6, 2025

(51) Int. Cl.
*G06F 21/62* (2013.01)
*G06N 20/10* (2019.01)

(52) U.S. Cl.
CPC ......... *G06F 21/6245* (2013.01); *G06N 20/10* (2019.01)

(58) Field of Classification Search
CPC . G06F 21/6245; G06F 21/6254; G06N 20/10; G06N 20/00
See application file for complete search history.

(56) References Cited

U.S. PATENT DOCUMENTS

| | | | | |
|---|---|---|---|---|
| 9,092,749 B2 * | 7/2015 | Kern | ............ | G06Q 10/063112 |
| 11,971,813 B2 * | 4/2024 | Gouda | ................ | G06F 11/3684 |
| 12,204,681 B1 * | 1/2025 | Chunduru | ........... | G06F 21/6254 |
| 12,242,444 B2 * | 3/2025 | Joyce | ................. | G06F 16/2228 |
| 2017/0236073 A1 * | 8/2017 | Borisyuk | ............... | G06Q 50/01 706/12 |
| 2023/0128136 A1 * | 4/2023 | Sahu | ...................... | G06F 16/41 726/26 |
| 2023/0306429 A1 * | 9/2023 | Shachar | ................. | G06N 20/00 |
| 2023/0333867 A1 * | 10/2023 | Agarwal | ............... | G06F 40/174 |
| 2023/0359765 A1 * | 11/2023 | Selvaraju | ........... | G06F 21/6245 |
| 2023/0368070 A1 * | 11/2023 | Bhargava | ............... | G16H 50/20 |
| 2023/0376826 A1 * | 11/2023 | Au | ......................... | G06N 3/045 |
| 2024/0161204 A1 * | 5/2024 | Bien | ..................... | G06Q 40/08 |
| 2024/0265141 A1 * | 8/2024 | Rattner | ............... | G06F 21/6254 |
| 2024/0428528 A1 * | 12/2024 | Vandikas | ............... | G06N 3/044 |
| 2025/0005175 A1 * | 1/2025 | Sumedrea | ........... | G06F 21/6254 |

* cited by examiner

*Primary Examiner* — David J Pearson
*Assistant Examiner* — Nega Woldemariam
(74) *Attorney, Agent, or Firm* — Workman Nydegger

(57) ABSTRACT

One example method includes automatically scanning, at a privacy data collector, received data to determine if the received data is related to an Artificial Intelligence (AI)/ Machine Learning (ML) workspace that is used to build an ML model. For the received data that is determined to be related to the AI/ML workspace, parsing the data, by the privacy data collector, to determine if the data includes any Personal Identifiable Information (PII) or other sensitive information. For the data that includes PII data or other sensitive data, generating, by a ML classification model, a privacy classification for the data. For the classified data, performing, by a data masking component, a data masking operation on the PII data or other sensitive data to generate masked data.

20 Claims, 11 Drawing Sheets

| Metadata | # Used |
|---|---|
| Full Name | 90k |
| SSN | 50k |
| Driver's License | 20k |
| ... | ... |

*FIG. 5B*

AUTOMATED PRIVACY PROFILING FRAMEWORK FOR MACHINE LEARNING WORKSPACES

FIELD OF THE INVENTION

Embodiments of the present invention generally relate to machine learning (ML) models. More particularly, at least some embodiments of the invention relate to systems, hardware, software, computer-readable media, and methods for the detection and removal of Personal Identifiable Information (PII) in workspaces that implement ML models.

BACKGROUND

The Machine Learning (ML) subfield of Artificial Intelligence (AI) provides automated methods for analysis of large sets of data that are too hard to program by hand. Various organizations like Amazon, Google, Microsoft, and VMWare have provided customers access to AI/ML Software Interfaces allowing them to easily embed their business use-cases into ML tasks on the vendors' platform. These ML as a service engine/tool lets data practitioners train classifiers, build machine learning models, serve them as APIs, etc., on public infrastructures and let others query results on their data. Some of these ML applications require private individuals Personal Identifiable Information (PII) data or credentials to data sources that would get access to restricted or highly restricted data, consequently exposing them to insider threat at these companies or outside threat to companies owning this data.

A Data Breach report published in 2022 indicated that the average data beach cost USD 4.35 million in comparison to USD 3.86 million on 2020. Various organizations are deploying a zero-trust approach as the companies which do not deploy zero trust incurred more than USD 1 million in cost. Breaches at organizations leveraging AI and automation tools cost USD 3.05 million less than at organizations without those tools. The report additionally indicates that compromised credentials, phishing, and cloud misconfiguration were the top attack vendors for enterprises and that Security AI alongside privacy had the biggest cost-mitigating effect. Extended detection and response technologies helped an average of 29 days in breach response time. A data breach/compromise incident occurs when there is a possibility of loss, theft, or disclosure of PII data, credentials, or highly confidential and sensitive information without the awareness of duty-related personnel or signing an NDA (Non-Disclosure Document).

To understand how machine learning works, it is important to understand how the data operates. Secure and Compliant Data of high quality is necessary for models to operate efficiently and generate the business value of data practitioners.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIGS. 5A-5C disclose aspects of an example embodiment of a Privacy Data Collector (PDC) of the PPE.

DETAILED DESCRIPTION OF SOME EXAMPLE EMBODIMENTS

Figure 1:
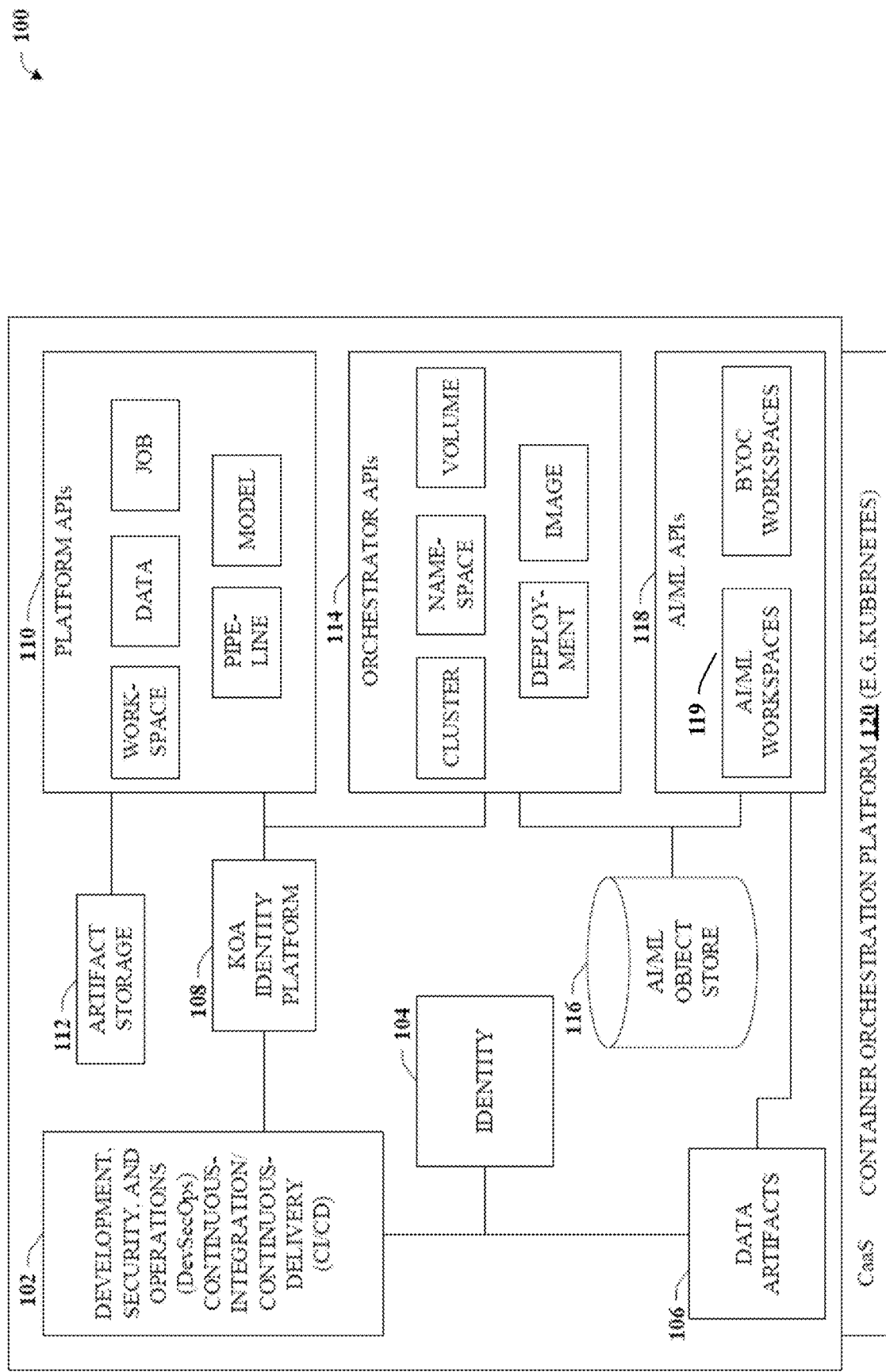
FIG. 1 discloses aspects of an example architecture that is used for deploying AI/ML applications as containers on top of Kubernetes.

Embodiments of the present invention generally relate to machine learning (ML) models. More particularly, at least some embodiments of the invention relate to systems, hardware, software, computer-readable media, and methods for the detection and removal of Personal Identifiable Information (PII) in workspaces that implement ML models.

One example method includes automatically scanning, at a privacy data collector, received data to determine if the received data is related to an Artificial Intelligence (AI)/Machine Learning (ML) workspace that is used to build an ML model. For the received data that is determined to be related to the AI/ML workspace, parsing the data, by the privacy data collector, to determine if the data includes any Personal Identifiable Information (PII) or other sensitive information. For the data that includes PII data or other sensitive data, generating, by a ML classification model, a privacy classification for the data. For the classified data, performing, by a data masking component, a data masking operation on the PII data or other sensitive data to generate masked data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments disclosed herein provide an automated framework to classify and annotate data utilizing PCI and ISO, compliance, and security knowledge bases. Using Deep Neural Networks alongside reinforcement learning techniques, input data present in AI/ML workspaces like JupyterLab, Airflow, JupyterHub or other python-based workspaces, are classified to internal, public, or restricted data. Then, the embodiments leverage a platform to mask the data for all the existing documents and in case of any new events (file additions on the workspace staging directory), the process rinses and repeats. Ultimately, data practitioners do not have to be concerned about GDPR or PCI compliance requirements as the masked data is staged and written back to disk in an automated fashion, and they can continue to focus on optimizing their application code.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for an Example Embodiment of the Invention

In general, private data is being used for a variety of machine learning (ML) applications. Search queries, browsing data, posts in social media, the videos that are watched, images that are viewed, and movie preferences are being collected and stored on a daily basis. This data collection happens via computers, devices on the edge, and in homes and offices. With the rise of these data collection forums, analytics has become one of the biggest drivers of business value. Analytics platforms rely heavily on ML to derive these actionable insights.

While ML algorithms leveraged on AI/ML workspace tools offer great insights, they completely depend on the data that is being fed during the learning and pre-processing stage. To build and deliver these machine learning capabilities, it is not unusual for organizations to hire, and groom dedicated machine learning engineers, cybersecurity engineers, product application security groups and legal teams to carefully analyze if the data that is being fed from external data sources into the platform is secure, compliant, and sanitized for consumption. By incorporating Privacy by Design (PbD) principles, ML system design teams can develop systems and processes that maintain and enhance the business value from data while maintaining the confidence and trust of the consumer.

Privacy by Design gives organizations and professionals the strategies and techniques to take a proactive approach to implementing privacy considerations. Its scope includes cybersecurity and privacy risk, privacy engineering, and privacy protection in any IT system design. It mandates that any system, process, or infrastructure that uses personal data consider privacy throughout its development lifecycle and identify possible risks to the rights and freedoms of the data subjects and minimize them before they can cause actual damage There are three core components involved while incorporating PbD principles. They are:
1) Minimize: Data processed should be restricted to the minimal amount necessary
2) Hide: Privacy data and their interrelationships should be hidden from plain view
3) Inform: Data subjects should be informed how their privacy information is processed, for what purpose, and by what means.

B. Example Problems that May be Addressed by an Embodiment of the Invention

Data scientists and architects need to decide on what is the best possible approach to fetch data, build models and run inference on top of the pre-built model. Data scientists must be an expert in Containers, Kubernetes, Data Security, Endpoints, Scaling, Persistent Volumes, GPUs DevOps, Programming in new languages, and tools, for example. Privacy and compliance for data introduced into AI/ML containers deployed on Kubernetes is assumed.

However, as data practitioners aspire to operate at scale to improve their model accuracy and have recurrent feedback loops back and forth various components in the data platform stack, the data breach surface area increases tremendously alongside data volume. FIG. 1 is illustrative of these problems, as it discloses an example architecture 100 that is used for deploying AI/ML applications as containers on top of Kubernetes.

With reference now to FIG. 1, a schematic block diagram of the example architecture 100 for deploying AI/ML applications as containers on top of a container orchestration platform in accordance with embodiments disclosed herein is shown. For example, development, security, and operations (DevSecOps) module 102 can provide development, security, and operations elements. Techniques relating to continuous-integration (CI) and/or continuous delivery (CD) can be employed.

DevSecOps module 102, an example of which can be Gitlab, can communicate with identity module 104, an example of which can be Vault; data artifacts module 106, which can be an image repository; and KOA identity platform 108, which ultimately communicate with platform APIs 110, orchestrator APIs 114, and the other deployed APIs, which in this case are AI/ML APIs 118.

It is noted that platform APIs 110 can communicate with artifact storage 112, and orchestrator APIs 114 or AI/ML APIs 118 can communicate with AI/ML object store 116. The various APIs (e.g., platform APIs 110, orchestrator APIs 114, and AI/ML APIs 118) can be containerized and run on top of container orchestration platform 120. In some embodiments, container orchestration platform 120 can provide containers-as-a-service (CaaS).

Typical sets of platform APIs 110 and orchestrator APIs 114 can be deployed on top of container orchestration platform 120. Additionally, certain AI/ML APIs 118 can be deployed as well, examples of which can include: an application or API for persisting the data in a cluster of the container orchestration platform 120 (e.g., persistent volume claim (PVC)), deployment for hosting the application, service for accessing the application internally within the cluster, ingress for allowing external traffic to access the AI/ML AIPs 118.

Platform APIs 110 and Orchestrator APIs 114 can be leveraged to deploy any AI/ML APIs 118 (e.g., AI/ML workspaces 119) on top of container orchestration platform 120 clusters. These operations can also be leveraged by using open-source helm charts or docker images on top of the existing environment. Credentials required to securely access various components of the infrastructure can be stored in a Key-Value store such as identity module 104 (e.g., Vault). The images required for provisioning workspaces, images, pipelines, and so forth can be stored in a registry service like Harbor. Every interaction between components in shared APIs can also be secured using KOA identity platform 108.

In more detail, platform APIs 110 can handle requests sent by a data practitioner. These requests can be routed via the Platform API 110 in the enterprise infrastructure, which can classify the request type sent by the user and store associated metadata relied upon by other elements or modules.

With regard to orchestrator APIs 114, based on the request received from Platform APIs 110, Orchestrator APIs 114 can interact with a server of the container orchestration platform 120 cluster directly. Such can fulfill the specification of creating workspaces, accessing services or frameworks within the infrastructure, or launching jobs using CPUs or GPUs. A set of Orchestrator controllers can execute the containers needed to complete the pipeline specified by the user.

In summary, in the example architecture 100 for deploying AI/ML applications as containers on top of a container orchestration platform typical sets of Kubernetes APIs get deployed on top of clusters. Thus, there are four components deployed via AI/ML Platform and Orchestrator APIs:

- One for persisting the data in the Kubernetes cluster (Persistent Volume Claim/Persistent Volume [PVC])
- Deployment for hosting the application
- Service for accessing the application internally within the cluster
- Ingress for allowing external traffic to access the AI/ML application.

As captured in FIG. 1, the container images are securely fetched from registry like Harbor and deployed via CI/CD solutions like Gitlab. The environment variables necessary to deploy these applications are fetched from Vault during runtime. In case there are any open-source packages that needs to be leveraged for running certain AI/ML workloads, they are fetched from the JFrog artifactory. The data currently stored in AI/ML workspaces are accessible across multiple clusters via network attached storage component (NFS). Some of the artifacts relevant to ML are stored and retrieved from ECS Object store.

As mentioned previously, the example architecture 100 for deploying AI/ML applications as containers on top of a container orchestration platform the data breach surface area increases tremendously alongside data volume. In order to prevent data breaches or to reduce the unwanted sharing of PII data, various systems have been developed. However, there are several problems with existing systems for preventing data breaches and the unwanted sharing of PII data.

One problem is that is difficult and resource intensive to perform manual data classification. It is not unusual for companies to hire dedicated SMEs to classify and understand if the data used for pre-processing, training, and building ML models is highly sensitive or restricted information. Another problem is categorical labeling. A data annotation process is tedious and requires meticulous inspection to whether input data sources in AI/ML workspaces has PII data and passwords for external data sources or not. It requires human intervention and is a time-consuming process. A further problem is policy and regulation changes. The need to choose the appropriate action plan for fixing data that does not comply with regulation rules is another demanding task for data scientists. A final problem is there is usually missing automation on what needs to be done on a periodic basis as data alongside compliance processes constantly evolve and expands on the AI/ML field. Expecting data practitioners to keep their data quality up to date with information governance rules and policies is a challenging process.

C. Detailed Description of an Example Embodiment of the Invention

C.1 Overview

The embodiments provided herein provide for a Preserving Privacy Engine (PPE) framework that provides users with an automated privacy compliance framework for any AI/ML data of csv, json, parquet, py or ipynb formats that are used in the example architecture 100 for deploying AI/ML applications as containers on top of a container orchestration platform.

The PPE of the embodiments disclosed herein integrated within the entire machine learning development lifecycle simplifies the identification of data that has enterprise-wide risk profile, secures it by automatically masking with consistency and delivers it to data scientists' environments before it becomes a serious threat to the organization. This framework enhances the compliance of popular AI/ML workspaces (e.g., AI/ML workspaces 119) like Jupyter Notebooks, Jupyter hub or Airflow, by creating an awareness for users on the possibility of data breaches when restricted information is brought in and gives mechanisms to fix them before it breaches Service Level Agreements (SLAs).

Figure 2:
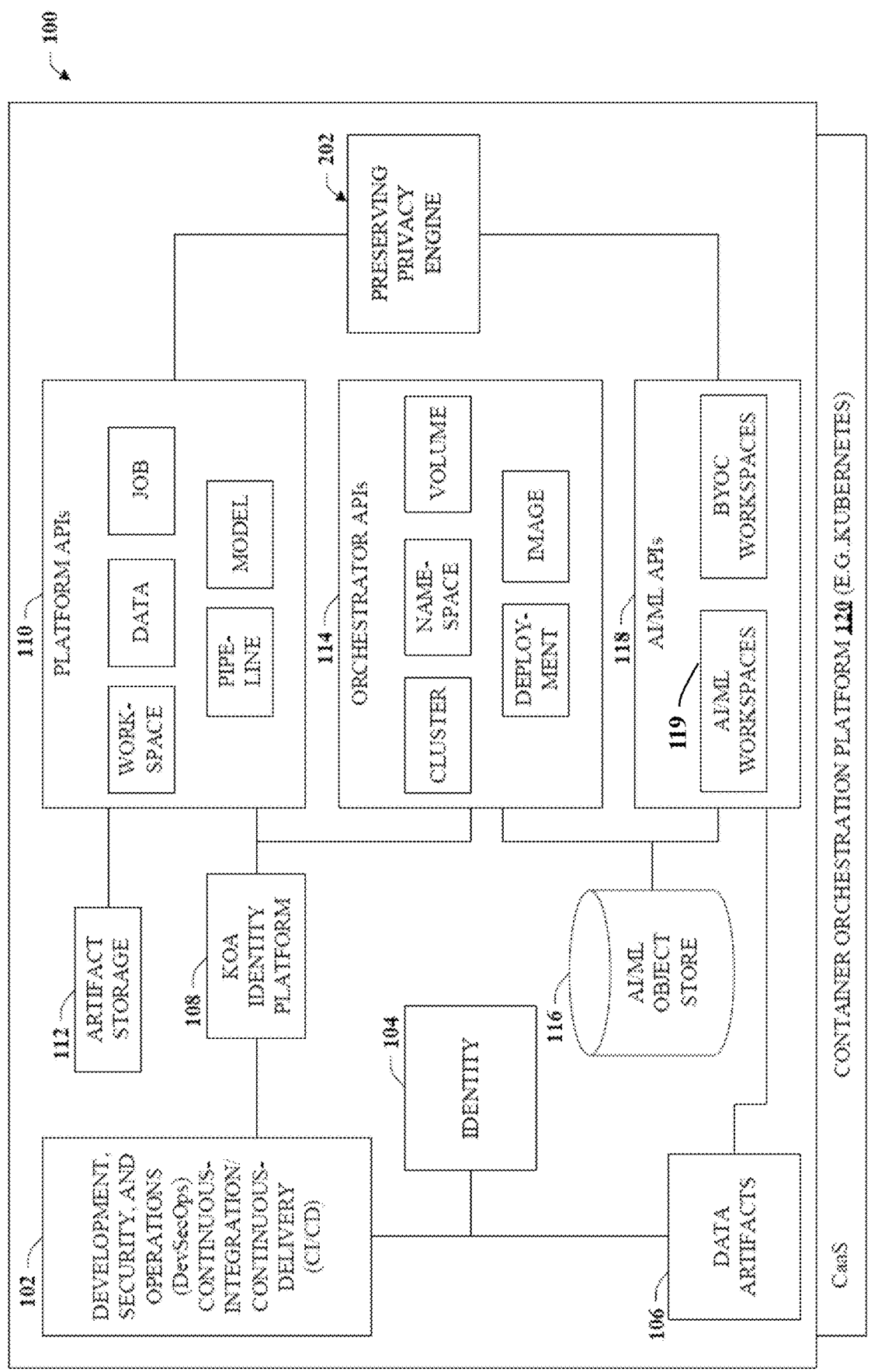
FIG. 2 discloses aspects of the example architecture of FIG. 1 including a Preserving Privacy Engine (PPE).

FIG. 2 shows an embodiment of how the PPE of the embodiments disclosed herein is integrated into the architecture 100 for deploying AI/ML applications as containers on top of a container orchestration platform of FIG. 1. As illustrated, FIG. 2 shows a PPE 202 that is integrated between the platform APIs 110 and the AI/ML APIs 118 that are associated with the AI/ML workspaces 119. Thus, the PPE 202 provide a framework for determining if any data input by users for use in the AI/ML workspaces 119 contains any PPI and if so, provides a mechanism to remove the PII so that the data scientists are able to continue to use the data in AI/ML workspaces 119 without the need to worry about potential data breaches of the PII.

The PPE 202 framework of FIG. 2, in some embodiments, does at least the following five key functionalities seamlessly:

1. Fetch a current set of documents of csv, json, parquet, py or ipynb formats from AI/ML workspaces 119 like Jupyter Notebooks or Airflows.
2. Consolidate privacy compliance recommended PCI and ISO knowledge base data.
3. Profile a list of documents and annotate the documents that are compliant vs non-compliant via neural networks with reinforcement learning techniques to improve classification accuracy.

4. Mask the secure data via a masking engine such as Delphix to ensure that the data is protected and to prevent a data breach for data with sensitive information.
5. Scan and profile any newly added documents into the AI/ML platform and synchronize it in an event-driven fashion.

C.2 Example Architecture According to One Embodiment of the Invention

Figure 3:
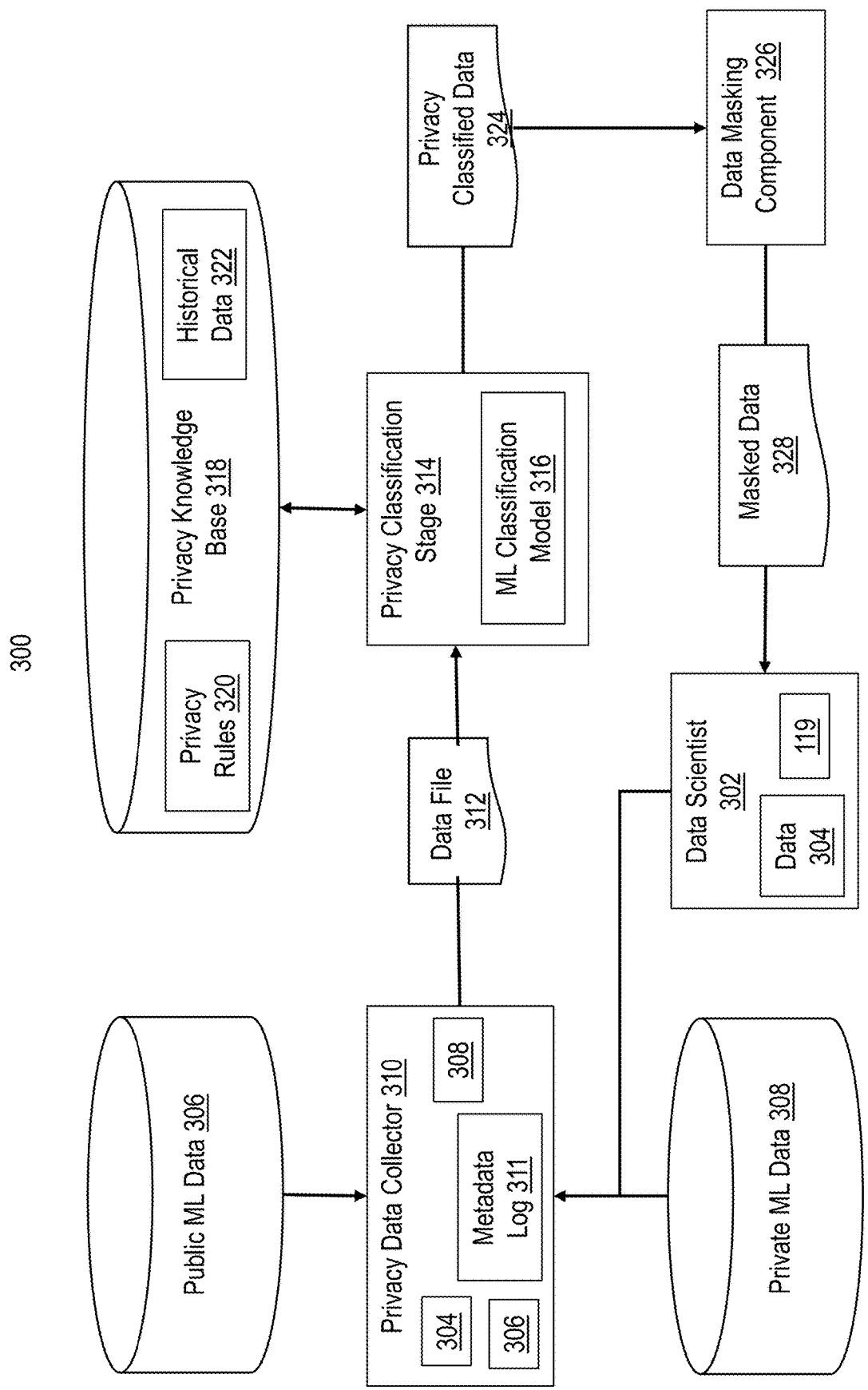
FIG. 3 discloses aspects of an example embodiment of a PPE.

With attention now to FIG. 3, an example embodiment of a PPE 300 that corresponds to the PPE 202 and the use of the PPE 300 is illustrated. As illustrated, a data scientist 302 may access the architecture 100 for deploying AI/ML applications as containers on top of a container orchestration platform of FIG. 1 to build an ML model using AI/ML workspaces 119 such as JupyterLab or a JupyterHub. In building the ML model, the data scientist 302 may use various data sources that are available to the AI/ML workspaces 119. For example, the data scientist 302 may use IDE data 304 from his or her intelligent development environment (IDE), may use public ML data 306 that is publicly available over the internet or from a public repository or the like associated with the architecture 100, or may use private ML data 308 from an internal or private repository or the like associated with the architecture 100.

The IDE data 304, the public ML data 306, and/or the private ML data 308 is accessed by a Privacy Data Collector (PDC) 310 that is a component of the PPE 300. In operation, the IDE data 304, the public ML data 306, and/or the private ML data 308 is continuously scanned by the PDC 310 to determine if the data includes any data related to AI/ML processes or other data science (DS) processes. The data is also scanned to see if it includes any PII data, passwords, sensitive data, or non-sensitive data. The data that is determined to be related to AI/ML processes, that includes PII data, passwords, or is considered sensitive data is included in a data file 312.

In some embodiments, as will be explained in more detail to follow, the PDC 310 scans metadata of the IDE data 304, the public ML data 306, and/or the private ML data 308 to see if the metadata is related to AI/ML/DS processes or includes PII data, passwords, or is considered sensitive data. The PDC 310 also maintains a PII metadata log 311 that includes common types of data that are AI/ML/DS processes and that includes PII data, passwords, or sensitive data. The PII metadata log 311 is generated based on data received from the public sources such as the internet or public repositories. The PII metadata log 311 is used by the PDC 310 to determine which of the accessed IDE data 304, the public ML data 306, and/or the private ML data 308 should be included in the data file 312.

The data file 312 may include different types of data that has different levels of privacy concerns. In addition, some of the data in the data file 312 may not actually have any privacy concerns as this data may have been selected by the privacy data collector in error. Accordingly, the PPE 300 includes a Privacy Classification Stage (PCS) 314 that is used to classify the data in the data file 312 and then to label the data. As illustrated, the PCS 314 includes a ML classification model 316 that is used to classify the data file 312. In one embodiment, the ML classification model 316 is a multi-class Support Vector Machine (SVM). However, other ML classifiers can be used to implement the ML classification model 316.

In operation, the ML classification model 316 accesses one or more privacy rules 320 that are stored in privacy knowledge base store 318. The privacy rules 320 specify existing privacy rules that are in force in the location of the data scientist 302 when he or she is building the ML module using the AI/ML workspaces 119. The privacy rules may be required by governmental agencies or by business organizations. Examples of the privacy rules 320 include, but are not limited to, the European General Data Protection Regulation (GDPR), the California Consumer Privacy Act (CCPA), the Payment Card Industry Data Security Standard (PCI), and the International Organization for Standardization Data Security Standard (ISO). The privacy knowledge base store 318 is continuously updated with any new privacy rules or with changes to existing privacy rules. Thus, the data scientist 302 need not keep up on which privacy rules are currently in effect in the location he or she is working.

The ML classification model 316 also accesses historical data 322 from the privacy knowledge base store 318. The historical data 322 includes historical examples of data files 312 that have been classified by the ML classification model 316. The historical data 322 can be used along with the privacy rules 320 to train the ML classification model 316.

Figure 4:
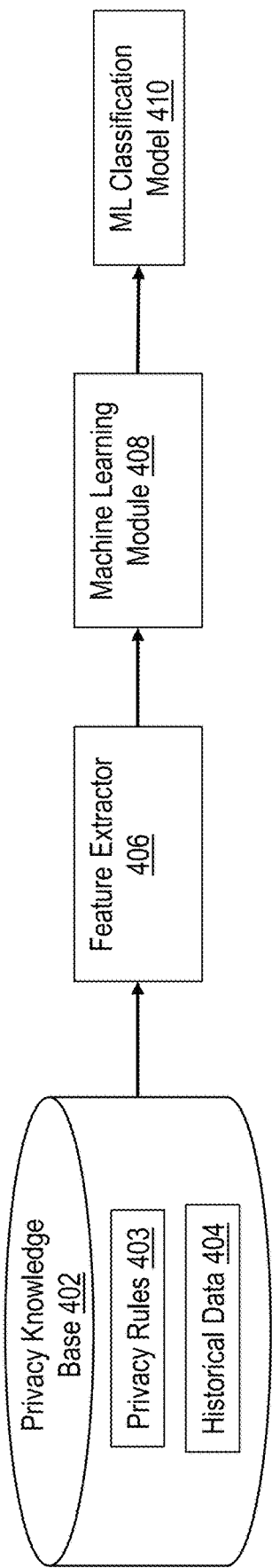
FIG. 4 discloses aspects of training a ML classification model of the PPE.

FIG. 4 illustrates an embodiment of an example ML network 400 that is configured to use historical data to train a ML classification model. As illustrated, the ML network 400, which can be implemented on a computing system that is the same as the computing system implementing the architecture 100 or implemented on a different computing system, includes a privacy knowledge base store 402 that may correspond to privacy knowledge base store 318 and that has stored thereon privacy rules 403 that may correspond to the privacy rules 320 and historical data 404, which may correspond to the historical data 322. The privacy rules 403 and the historical data 404 is processed by a feature extractor 406 configured to extract features from the privacy rules 403 and the historical data 404. The features extracted by the feature extractor 406 may include the different classification labels based on the types of data and the relevant privacy rules. The extracted features are then used by a machine-learning module 408 to train a ML classification model 410, which may correspond to the ML classification model 316 previously described.

Returning to FIG. 3, the ML classification model 316 determines a privacy classification for the data file 312 and a corresponding label based on the privacy rules 320 and the type of data included in the data file 312. For example, in one embodiment the ML classification model 316 may determine if the data file 312 should be given a privacy classification of "internal data", a privacy classification of "restricted data", a privacy classification of "highly restricted data", or a privacy classification of "not restricted data". Thus, data with little or no PII data may be a privacy classification of and labeled as not restricted. However, data with a high amount of PII data may be a privacy classification of and labeled as restricted or highly restricted. Data that is mostly data internal or private to an organization may be a privacy classification of and labeled as internal. Of course, other classifications and labels may be determined by the ML classification model 316 as operating circumstances warrant. The PCS 314 then generates privacy classified data 324 that represents the data of the data file 312 that has now been given a privacy classification by the ML classification model 316.

The privacy classified data 324 is then accessed by a Data Masking Component (DMC) 326 of the PPE 300. In operation, the DMC 326 determines if privacy classified data 324 has been properly classified. In addition, the DMC 326 performs a data masking operation on the privacy classified data 324. The data masking operation modifies any PII, or other sensitive data included in the privacy classified data 324 in such as way that it is of little or no value to unauthorized users while still being usable by the data scientist 302 in the building of the ML model. Accordingly, any reasonable masking operation may be performed by the DMC 326 to mask the privacy classified data 324. The masking operation generates masked data 328. The masked data 328 is then returned to the AI/ML workspaces 119 so that the data scientist 302 can continue to build the ML models and orchestrate then as workflows using the other tools of the architecture 100.

In some embodiments, any privacy classifications that are determined to be incorrect are added to the historical data 322 so as to be used in further training of the ML classification model 316. In addition, correct privacy classifications are also added to the historical data 322 so as to be used in further training of the ML classification model 316.

It will be appreciated that the operation of the PPE 300 is automatically done. Thus, the data scientist 302 need not worry about whether or not privacy rules are being violated during the building of the ML models. In addition, any time new IDE data 304, the public ML data 306, and/or the private ML data 308 is used or any existing IDE data 304, the public ML data 306, and/or the private ML data 308 is modified, the operation of the PPE 300 is automatically performed, resulting in the masking of any PII or sensitive data in the new or modified IDE data 304, the public ML data 306, and/or the private ML data 308.

Briefly then, the example PPE 300 according to one embodiment of the invention may be implemented to comprise various components. These components may include the PDC 310, the PCS 314, and the DMC 326. These components, which may each comprise a respective ML model to carry out their respective functions, are considered in turn below.

C.2.1 Aspects of an Example PDC

Figure 5A:
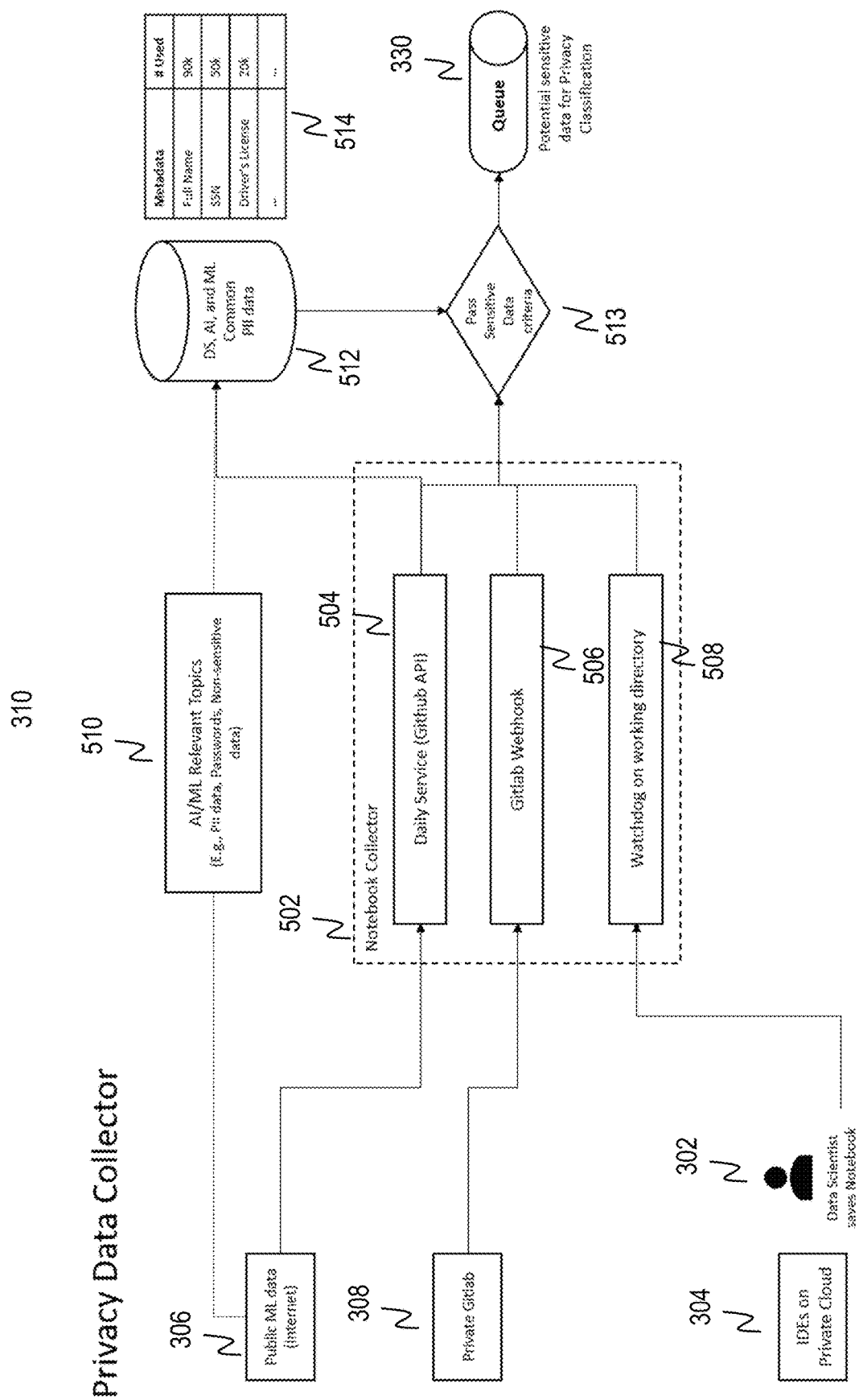

FIG. 5A illustrates an example embodiment of the PDC 310. As shown in FIG. 5A, the example embodiment of the PDC 310 receives the IDE data 304 from the intelligent development environment (IDE) of the data scientist 302, the public ML data 306 from the internet or public repositories, and the private ML data 308 from the private repository such as a Gitlab repository and places the data in a notebook collector 502. For example, the IDE data 304 is placed in a directory 508, the public ML data 306 is placed in a directory 504, and the private data is placed in a directly 506 of the netbook collector 502.

In one embodiment, GitHub API, is a daily service that is run to retrieve all notebooks on repositories with topics relevant to AI/ML/DS. Gitlab webhook is another service which is executed to unveil anyone who recently started to work on AI/ML/DS projects and that has introduced sensitive or in-sensitive data into the platform. Though it retrieves a lot of unlikely candidates, this helps optimize the topic selection problem. Every repository is scarped during every "Push" that is made within the Gitlab repository. Given that not every user utilizes version control tools such as Gitlab or GitHub, IDEs on private cloud also is monitored for any file event on the path, the data scientist 302 is working on.

As shown at 510, the PDC 310 accesses the pubic data sources such as the internet or public repositories to continuously generate and then maintain a PII metadata log 512, which may correspond to the PII metadata log 311, that includes a common PII metadata list 514 that is comprised of the top PII and other sensitive information found on notebook collectors of the internet and the public repositories having topics relevant to AI/ML/DS.

FIG. 5B illustrates an example embodiment of the common PII metadata list 514. As illustrated, the common PII metadata list 514 lists metadata 516 that is included in the notebook collectors having topics relevant to AI/ML/DS and the number of times 518 that the metadata 516 is used. Thus, FIG. 5B shows full name metadata 520 is used 90k times as shown at 522, social security number (SSN) metadata 524 is used 50k times as shown at 526, and driver's license number metadata 528 is used 20k times as shown at 530. The ellipses illustrate that there can be any number of additional PII metadata types 532 included on the common PII metadata list 514 and that this metadata can be used any number of time as illustrated by the ellipses 534.

Figure 5C:
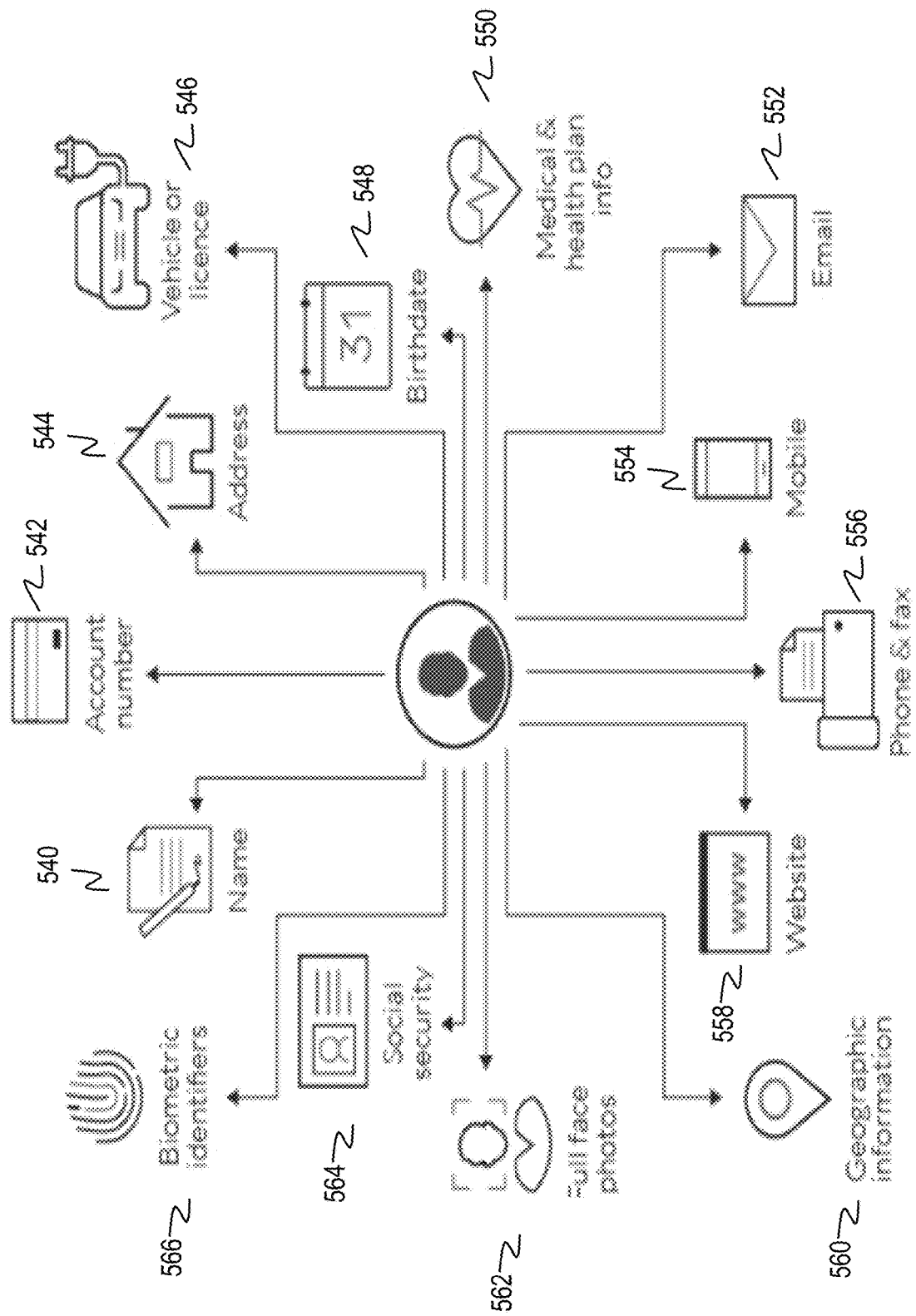

FIG. 5C illustrates some of the types of metadata that can be included in the common PII metadata list 514 as part of the additional PII metadata types 532. For example, the additional PII metadata types 532 include a name 540, account number information 542, address information 544, vehicle information 546, birthdate 548, medical and health information 550, email address 552, mobile phone number 554, phone and fax number 556, website information 558, geographic information 560, photographs with full face features 562, social security information 564, and biometric identifiers 566. It will be appreciated that the PII metadata types shown in FIG. 5C are by way of example only and thus any number of additional PII metadata types may also be included in the common PII metadata list 514.

Returning to FIG. 5A, the common PII metadata list 514 is used to is used by the PDC 310 to determine 513 which of the accessed IDE data 304, the public ML data 306, and/or the private ML data 308 includes the PII data found on the common PII metadata list 514. In other words, the metadata of the IDE data 304, the public ML data 306, and/or the private ML data 308 is evaluated and must have at least one artifact that matches PII on the continuously maintained common PII metadata list 514. This occurs whenever the notebook collector 502 is saved. The data in the notebook collector 502 matching the metadata of the common PII metadata list 514 is sent as data file 312 to a queue 330.

C.2.2 Aspects of an Example PCS

Figure 6:
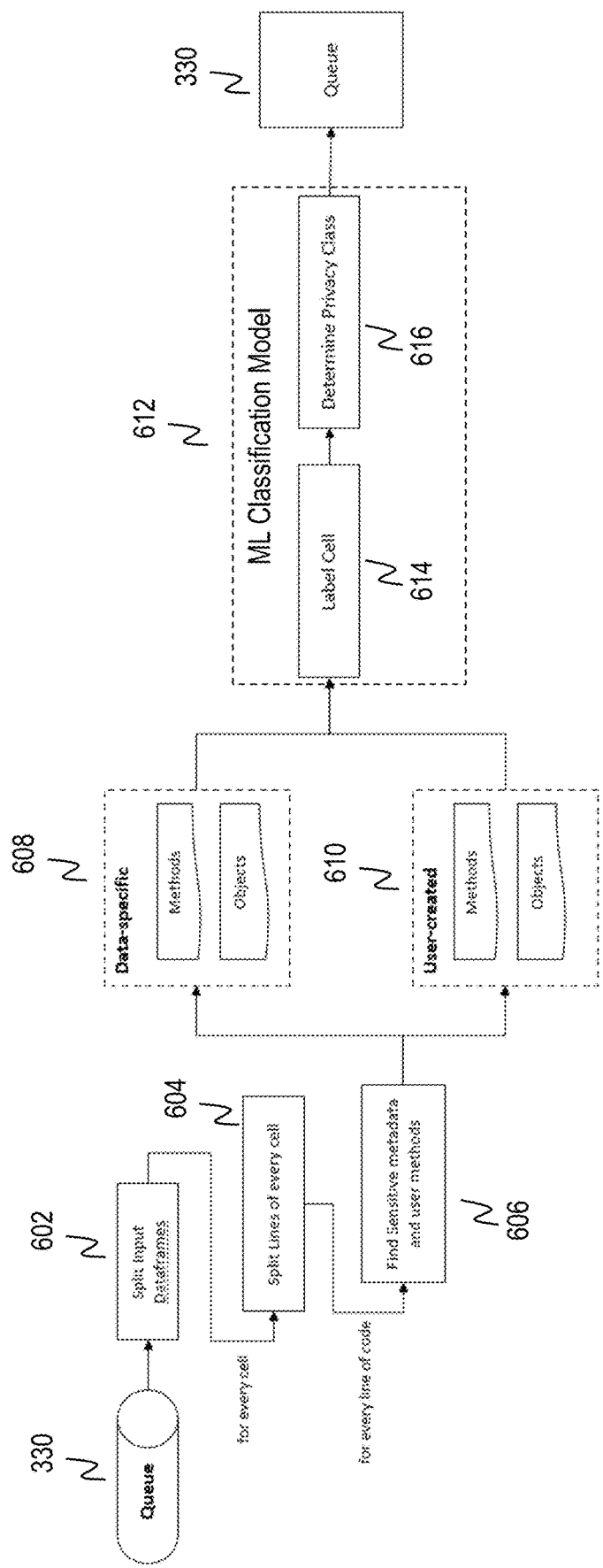
FIG. 6 discloses aspects of an example embodiment of a Privacy Classification Stage (PCS) of the PPE.
Figure 7:
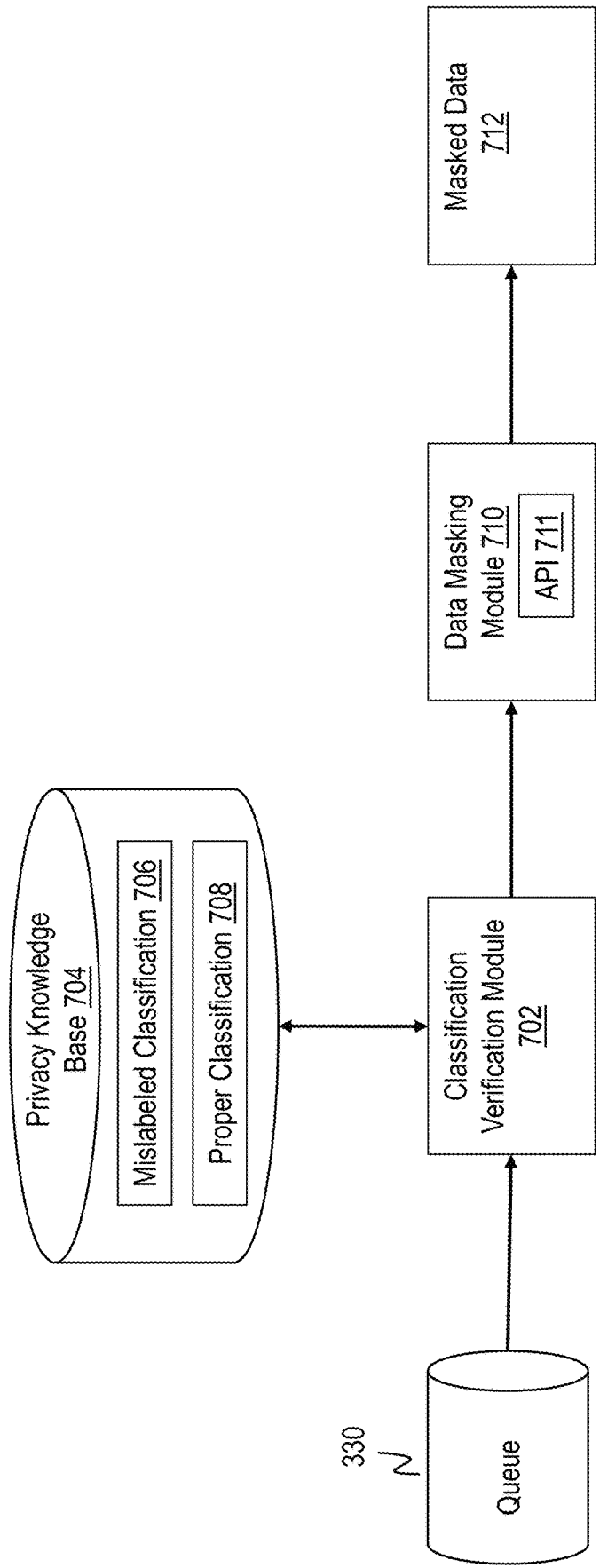
FIG. 7 discloses aspects of an example embodiment of a Data Masking Component (DMC) of the PPE.

FIG. 6 illustrates an example embodiment of the PCS 314. As shown in FIG. 6, the example embodiment of the PCS 314 retrieves the data file 312 for privacy classification from queue 330, and splits 602 the input data frames. After splitting the input data frames, every cell within the AI/ML workspaces 119 is split 604. After splitting every cell within the AI/ML workspaces 119, all lines within the cells are parsed, and for every line of code, sensitive metadata and user methods are found 606.

Scraping the objects and methods that are present in AI/ML workspaces 119 helps to classify if artifacts in the methods are Data-specific methods 608 or User-created methods 610. Data-specific methods are methods which are used to profile the metadata of files in csv, json, parquet, py, pynb or related textual data formats. User-created methods, on the other hand, are used to understand if there is any sensitive data such as credentials or if there is any user cells which has some sensitive PII information. This can enrich prefixes, roots, and suffixes knowledge base for future classifications. Combining these two categories and feeding them into a Multi-Class Support Vector Machine (SVM) classifier 612, which may correspond to the ML classification model 316, helps to label the cell 614 and determine the privacy classification 616. In one embodiment, the privacy classification is one of internal, restricted, or highly restricted information. The results of the classifier are sent to the queue 330.

It is important to note that SVM classifier 612 does not support multi-classification natively. It supports binary classification and separates input data into two classes. For multiclass classification, a similar principle is applied where the data points are broken down into multiple binary classification problems. Directed Acyclic Graphs (DAG), Binary Tree (BT), One Against One (OAO) and One Against All (OAA) are some of the ways to solve multi-class classification problems for SVM. It is called One-to-Rest approach where the classifier uses "m" SVMs. Each SVM would predict membership in one of the "m" classes. In the One-to-One approach, the classifier uses m*(m−1)/2 SVMs.

In summary, every cell is enriched with metadata as PII information, credentials, and connectors. Ultimately these categorization techniques are used to label every cell present in the notebooks in an automated fashion within this framework, thus consequently determining the privacy category for the data. Based on its labels and previous knowledge, every cell is assigned to a class, thus helping in deciding the masking strategy of the DMC 326.

C.2.3 Aspects of an Example DMC

FIG. 6 illustrates an example embodiment of the DMC 326. As shown in FIG. 6, the example embodiment of the DMC 326 receives the privacy classified data 324 from the queue 330. A classification verification module 702 tests the privacy classified data 324 to determine if the classification and label provided by the PCS 314 is correct. If the classification is incorrect, this is stored in privacy knowledge base store 704, which may correspond to the privacy knowledge base store 318, as a mislabeled classification 706. This helps to train the ML classification model 316 to prevent the mislabeling in the future. In the case where the classification verification module 702 comprises a reinforcement learning model or where the ML classification model 316 implements reinforcement learning, the mislabeled classification 706 may function as a negative reinforcement.

If the classification is correct, this is stored in privacy knowledge base store 704 as a proper classification 708. This helps to train the ML classification model 316 to continue to properly classify in the future. In the case where the classification verification module 702 comprises a reinforcement learning model or where the ML classification model 316 implements reinforcement learning, the proper classification 708 may function as a positive reinforcement.

The example embodiment of the DMC 326 includes a data masking module 710 that performs data masking on the privacy classified data 324. As previously described, the data masking modifies any PII, or other sensitive data included in the privacy classified data 324 in such a way that it is of little or no value to unauthorized users while still being usable by the data scientist 302 in the building of the ML model.

In one embodiment, the data masking module includes an API 711 that allows for the customization of the data masking mechanism and algorithm used to perform the data masking. The data masking module 710 then generates masked data 712, which may correspond to the masked data 328.

In one example embodiment, the DMC 326 may comprise the Delphix profiling service. The Delphix profiling service has an inventory of rules that is necessary to profile and identify sensitive data. It provided another validation on top of the SVM classifier and adds metadata rules to the existing Delphix profiler as necessary. As every pipeline stage comes with all labels assigned to its cells as inputs, it would be easier to map if the data attributes should be masked or not.

If any of these cells are mis-classified, the details are captured in the knowledge base so that it is less likely to be misplaced in the future. This negative reinforcement technique can be used to teach specific behaviors pertaining to privacy classifications and building so that false positives and negative parameters can be caught and discarded well in-advance. If the predictions of stages are accurately done, that is fed back to the knowledge base to comprehend the reasons for successfully running the pipeline. This is called a positive reinforcement technique. Every classification stage for the given metadata and credentials are also captured in knowledge base. These stages are run as containers before data scientists start to build and deploy their ML models to production. It is also important to highlight that the framework offers a mechanism to customize the algorithm used for masking via Masking APIs and iterate as necessary to keep them consistent with the privacy policies and rules.

D. Further Discussion

As apparent from this disclosure, example embodiments disclosed herein may possess various useful aspects and features. Some examples of these follow.

For example, an embodiment disclosed herein may implement a PPE framework that improves awareness about GDPR, ISO and PCI compliance process for all data csv, json, parquet, py, pynb or related textual data formats introduced into AI/ML workspaces or any other custom containers that is deployed on top of end-users' cloud native infrastructures.

An embodiment disclosed herein may introduce automation to keep the platform compliant even when new changes are introduced by an Information Governance committee. Guaranteeing end-to-end automation right from the discovery of restricted data in the platform, classifying and masking of sensitive data reinforces security. Chances of attack drop significantly as all applications are profiled via reinforcement techniques so that it becomes much better over time.

An embodiment disclosed herein implements a data classification stage that leverages a multi-class Support Vector Machine Classifier to predict if the metadata and its' corresponding data attributes have sensitive information like PII data or not. With the current automated labeling process, it guarantees security and governance for data practitioners who are usually focused on improving their application code.

A further embodiment disclosed herein implements an event-driven framework so that whenever new data is introduced into the platform, the profiling and masking capabilities kicks off automatically in a proactive fashion and updates the privacy knowledge base on an ad hoc basis.

E. Example Methods

Figure 8:
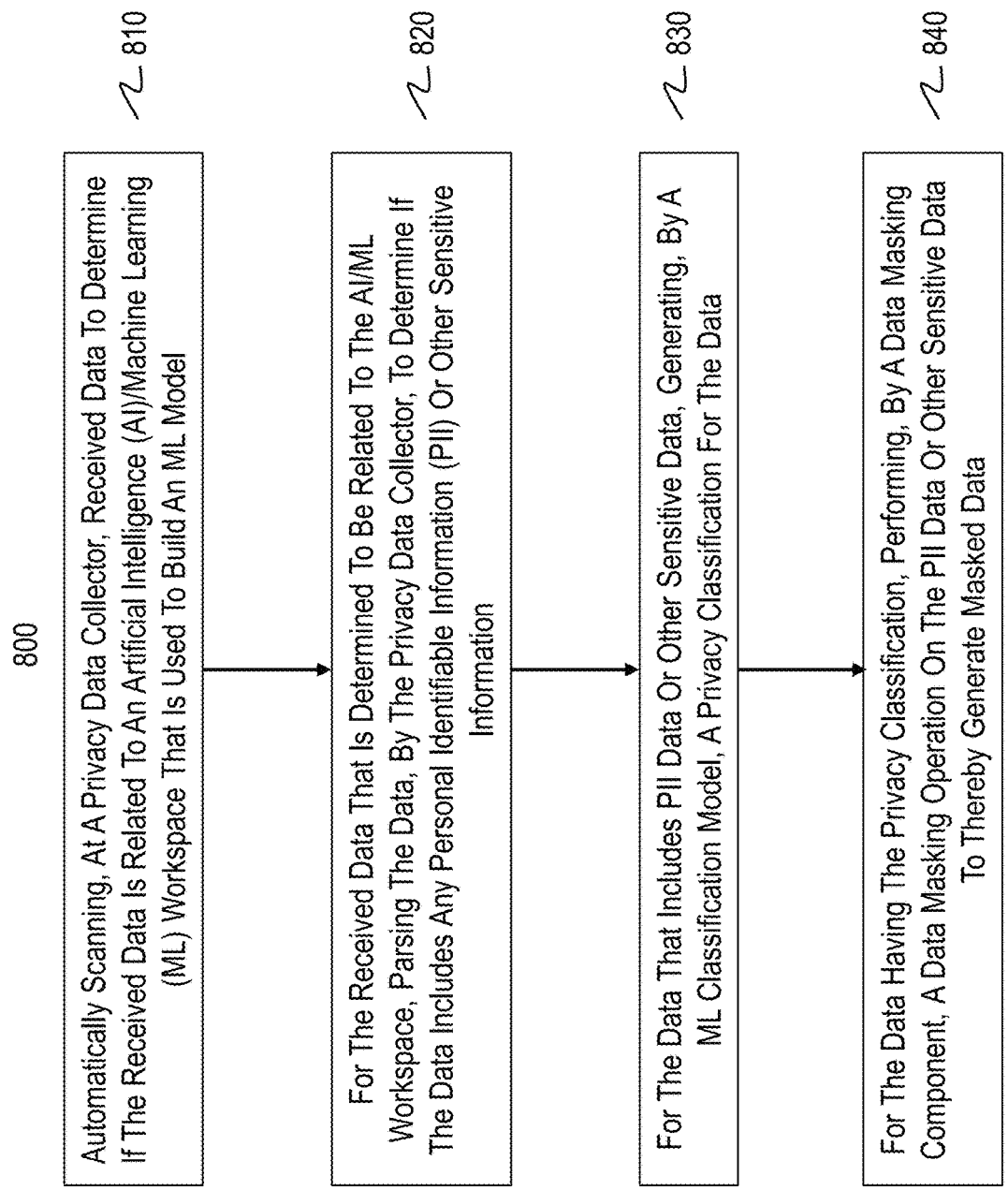
FIG. 8 discloses an example method according to an embodiment.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 is disclosed. The method 800 will be described in relation to one or more of the figures previously described, although the method 800 is not limited to any particular embodiment.

The method 800 includes automatically scanning, at a privacy data collector, received data to determine if the received data is related to an Artificial Intelligence (AI)/Machine Learning (ML) workspace that is used to build an ML model (810). For example, as previously described the PDC 310 automatically scans the IDE data 304 received from the IDE of the data scientist 302, the public ML data 306 received from the internet or public repositories, and the private ML data 308 received from the private repositories. The PDC 310 then determines if the revised data is related to the AI/ML workspaces 119 used to build an ML model.

The method 800 includes for the received data that is determined to be related to the AI/ML workspace, parsing the data, by the privacy data collector, to determine if the data includes any Personal Identifiable Information (PII) or other sensitive information (820). For example, as previously described the PDC 310 parses the IDE data 304, the public ML data 306, and the private ML data 308 to determine if the data includes PII or other sensitive information. In some embodiments, this is done by parsing metadata and comparing the metadata to the common PII metadata list 514.

The method 800 includes for the data that includes PII data or other sensitive data, generating, by a ML classification model, a privacy classification for the data (830). For example, as previously described the ML classification model 316 of the PCS 314 provides a privacy classification for the data to generate the privacy classified data 324.

The method 800 includes for the data having the privacy classification, performing, by a data masking component, a data masking operation on the PII data or other sensitive data to thereby generate masked data (840). For example, as previously described the DMC 326 performs a data masking operation on the privacy classified data 324 to generate the masked data 328. The masked data 328 can then be used in the AI/ML workspaces 119 to build the ML model.

F. Further Example Embodiments

Following are some further example embodiments of the invention. These are presented only by way of example and are not intended to limit the scope of the invention in any way.

Embodiment 1. A method, comprising: automatically scanning, at a privacy data collector, received data to determine if the received data is related to an Artificial Intelligence (AI)/Machine Learning (ML) workspace that is used to build an ML model; for the received data that is determined to be related to the AI/ML workspace, parsing the data, by the privacy data collector, to determine if the data includes any Personal Identifiable Information (PII) or other sensitive information; for the data that includes PII data or other sensitive data, generating, by a ML classification model, a privacy classification for the data; and for the data having the privacy classification, performing, by a data masking component, a data masking operation on the PII data or other sensitive data to thereby generate masked data.

Embodiment 2. The method as recited in any preceding embodiment, further comprising: providing the masked data to the AI/MML workspace to be used in building the ML model.

Embodiment 3. The method as recited in any preceding embodiment, wherein the ML classification model is a multi-class Support Vector Machine (SVM).

Embodiment 4. The method as recited in any preceding embodiment, wherein determining if the data includes any Personal Identifiable Information (PII) or other sensitive information comprises: scanning metadata of the received data that is determined to be related to the AI/ML workspace to determine PII data or other sensitive data included in the metadata; and comparing the metadata of the received data with a continuously updated common PII metadata list that is associated with the privacy data collector.

Embodiment 5. The method as recited in any preceding embodiment, wherein the PII data includes one or more of a name, account number information, address information, vehicle information, birthdate, medical and health information, email address, mobile phone number, phone and fax number, website information, geographic information, photographs with full face features, social security information, and biometric identifiers.

Embodiment 6. The method as recited in any preceding embodiment, wherein the ML classification model is trained using one or more of privacy rules and historical classification data.

Embodiment 7. The method as recited in any preceding embodiment, wherein the ML classification model uses one or more privacy rules when generating the privacy classification for the data.

Embodiment 8. The method as recited in any preceding embodiment, wherein one or more privacy rules comprise one or more of European General Data Protection Regulation (GDPR), California Consumer Privacy Act (CCPA), Payment Card Industry Data Security Standard (PCI), or International Organization for Standardization Data Security Standard (ISO).

Embodiment 9. The method as recited in any preceding embodiment, wherein the received data is received from one or more of a public repository, a private repository, or an intelligent development environment (IDE) that are associated with the AI/ML workspace.

Embodiment 10. The method as recited in any preceding embodiment, further comprising: verifying, by the data masking component, that the generated privacy classification for the data is correct.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
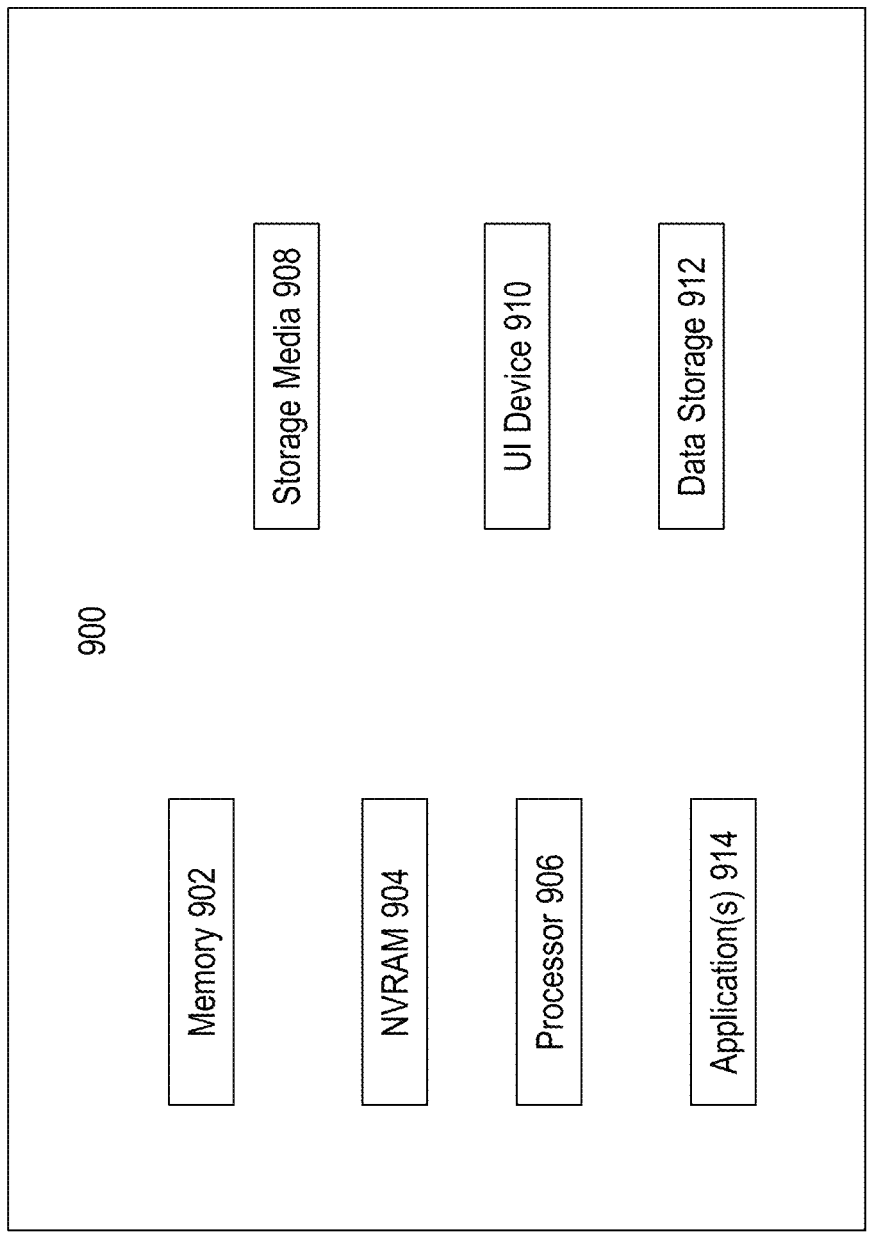
FIG. 9 discloses an example computing entity configured and operable to perform any of the disclosed methods, processes, and operations.

With reference briefly now to FIG. 9, any one or more of the entities disclosed, or implied, and/or discussed elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   automatically scanning, at a privacy data collector, received data originating from an Artificial Intelligence (AI)/Machine Learning (ML) workspace to determine if the received data is related to the Artificial Intelligence (AI)/Machine Learning (ML) workspace that is used to build an ML model;
   for the received data that is determined to be related to the AI/ML workspace, parsing the data, by the privacy data collector, to determine if the data includes any Personal Identifiable Information (PII) or other sensitive information;

for the data that includes PII data or other sensitive data, generating, by a ML classification model, a privacy classification for the data, wherein the ML classification model is trained using one or more of privacy rules and historical classification data stored in a privacy knowledge base, and the privacy classification is selected from multiple privacy levels including at least internal data, restricted data, and highly restricted data; and for the data having the privacy classification, performing, by a data masking component, a data masking operation on the PII data or other sensitive data to thereby generate masked data, wherein the data masking component includes a classification verification module configured to verify the correctness of the privacy classification and to update the privacy knowledge base with feedback data for future training of the ML classification model.

2. The method of claim 1, further comprising:
providing the masked data to the AI/MML workspace to be used in building the ML model.

3. The method of claim 1, wherein the ML classification model is a multi-class Support Vector Machine (SVM).

4. The method of claim 1, wherein determining if the data includes any Personal Identifiable Information (PII) or other sensitive information comprises:
scanning metadata of the received data that is determined to be related to the AI/ML workspace to determine PII data or other sensitive data included in the metadata; and
comparing the metadata of the received data with a continuously updated common PII metadata list that is associated with the privacy data collector.

5. The method of claim 1, wherein the PII data includes one or more of a name, account number information, address information, vehicle information, birthdate, medical and health information, email address, mobile phone number, phone and fax number, website information, geographic information, photographs with full face features, social security information, and biometric identifiers.

6. The method of claim 1, wherein the ML classification model is trained using one or more of privacy rules and historical classification data.

7. The method of claim 1, wherein the ML classification model uses one or more privacy rules when generating the privacy classification for the data.

8. The method of claim 7, wherein the one or more privacy rules comprise one or more of European General Data Protection Regulation (GDPR), California Consumer Privacy Act (CCPA), Payment Card Industry Data Security Standard (PCI), or International Organization for Standardization Data Security Standard (ISO).

9. The method of claim 1, wherein the received data is received from one or more of a public repository, a private repository, or an intelligent development environment (IDE) that are associated with the AI/ML workspace.

10. The method of claim 1, further comprising:
verifying, by the data masking component, that the generated privacy classification for the data is correct.

11. A non-transitory storage medium having stored therein instructions that are executable by one or more hardware processors to perform operations comprising:
automatically scanning, at a privacy data collector, received data originating from an Artificial Intelligence (AI)/Machine Learning (ML) workspace to determine if the received data is related to the Artificial Intelligence (AI)/Machine Learning (ML) workspace that is used to build an ML model;

for the received data that is determined to be related to the AI/ML workspace, parsing the data, by the privacy data collector, to determine if the data includes any Personal Identifiable Information (PII) or other sensitive information;

for the data that includes PII data or other sensitive data, generating, by a ML classification model, a privacy classification for the data, wherein the ML classification model is trained using one or more of privacy rules and historical classification data stored in a privacy knowledge base, and the privacy classification is selected from multiple privacy levels including at least internal data, restricted data, and highly restricted data; and for the data having the privacy classification, performing, by a data masking component, a data masking operation on the PII data or other sensitive data to thereby generate masked data, wherein the data masking component includes a classification verification module configured to verify the correctness of the privacy classification and to update the privacy knowledge base with feedback data for future training of the ML classification model.

12. The non-transitory storage medium of claim 11, further comprising:
providing the masked data to the AI/MML workspace to be used in building the ML model.

13. The non-transitory storage medium of claim 11, wherein the ML classification model is a multi-class Support Vector Machine (SVM).

14. The non-transitory storage medium of claim 11, wherein determining if the data includes any Personal Identifiable Information (PII) or other sensitive information comprises:
scanning metadata of the received data that is determined to be related to the AI/ML workspace to determine PII data or other sensitive data included in the metadata; and
comparing the metadata of the received data with a continuously updated common PII metadata list that is associated with the privacy data collector.

15. The non-transitory storage medium of claim 11, wherein the PII data includes one or more of a name, account number information, address information, vehicle information, birthdate, medical and health information, email address, mobile phone number, phone and fax number, website information, geographic information, photographs with full face features, social security information, and biometric identifiers.

16. The non-transitory storage medium of claim 11, wherein the ML classification model is trained using one or more of privacy rules and historical classification data.

17. The non-transitory storage medium of claim 11, wherein the ML classification model uses one or more privacy rules when generating the privacy classification for the data.

18. The non-transitory storage medium of claim 17, wherein the one or more privacy rules comprise one or more of European General Data Protection Regulation (GDPR), California Consumer Privacy Act (CCPA), Payment Card Industry Data Security Standard (PCI), or International Organization for Standardization Data Security Standard (ISO).

19. The non-transitory storage medium of claim 11, wherein the received data is received from one or more of a public repository, a private repository, or an intelligent development environment (IDE) that are associated with the AI/ML workspace.

20. The non-transitory storage medium of claim 11, further comprising:
 verifying, by the data masking component, that the generated privacy classification for the data is correct.

* * * * *